May 14, 1968 L. LA FOND YOUNG 3,382,720

SHARPLY BENT TUBING FOR BOURDON TUBE

Filed June 9, 1965

INVENTOR.
LLOYD LaFOND YOUNG

BY *Darby & Darby*

ATTORNEYS

# United States Patent Office 3,382,720
Patented May 14, 1968

3,382,720
SHARPLY BENT TUBING FOR
BOURDON TUBE
Lloyd La Fond Young, Stratford, Conn., assignor to
Dresser Industries, Inc., Stratford, Conn., a corporation of Delaware
Filed June 9, 1965, Ser. No. 462,702
8 Claims. (Cl. 73—418)

ABSTRACT OF THE DISCLOSURE

A Bourdon tube constructed as a spiral of flattened small diameter tubing and terminating cylindrically at its open end in a sharp right angle bend axially of the spiral.

---

This invention comprises a method of effecting sharp bends in small diameter, thin-walled tubing of flattened section without collapsing it and the product.

One of the objects of the invention is to provide a novel Bourdon spring comprising a unitary tube formed as a spiral to lie in a single plane and having an input terminal and extending at right angles to that plane and lying in the center of the spiral.

More specifically, this invention involves a novel single piece Bourdon spring in which the input end is of circular cross section and wherein the spiral portion of the spring is of generally rectangular cross section, or more specifically a flat oval with a lateral deformation.

Still another object of the invention is to provide a novel small diameter, thin-walled Bourdon spring tube wherein structural provision is made to permit extremely sharp bends without collapsing the tube during the formation of the final article so that the input end can extend at right angles to the plane of the operating portion.

Although the invention is not limited thereto, the subject matter thereof is of special advantage in the production of extremely small Bourdon springs from small diameter, thin-walled tubing, requiring multiple bends of extremely small radii, shaped to prevent collapse of the tube in making such bends.

A further object of the invention is to provide a novel method of manufacturing small spiral Bourdon springs in which the input end of the Bourdon tube is an integral part of the tube from which the spring is made.

Other and more detailed objects of this invention will be apparent from the following description of the embodiment thereof selected for illustration in the accompanying drawings.

Broadly the product and method applies to the tube as well as to specific articles made therefrom. Thus, the following description of a specific article is but exemplary of other products which employ the tube of this invention.

As is well understood in the fluid pressure gauge art, Bourdon springs are commonly used as the actuating element for the needle displacing mechanism. In the fabrication of the Bourdon spring it is common to shape the tube of which the spring is formed as a spiral in a single plane with a constant cross section throughout its length. A machined socket is attached to the input end of the coil. Its cost of manufacture and assembly depends on its construction. In the manufacture of very small bourdon springs further complication and expense is introduced in machining the socket and attaching it to the spring by the usual methods. A purpose of this invention is to form the Bourdon spring of a single piece of tubing having the part of the tubing which is wound into spiral form of flattened cross section leaving the input end of circular cross section. This permits the use of a simple socket form.

Because of the small diameters of the tubes required for small gauges and in order to keep the stresses encountered in fabrication within usable limits, it is necessary that the required bends be very sharp. In the spring illustrated the distance from the center line of the cylindrical portion of the tube to the inside convolution of the spring is approximately 1/8". This distance is less than twice the diameter of the tubing. Normally in order to obtain a bend in tubing at least one diameter and preferably more must be allowed for the radius of the bend, which, in the case of the spring being described, is 1/16". In order to make it possible to obtain very sharp radius bends, in accordance with this invention, the cross section of the tubing is modified, as will be explained, to prevent collapsing of the tubing.

The true nature of the improvements herein disclosed can best be explained in connection with the accompanying drawings.

Figure 1:
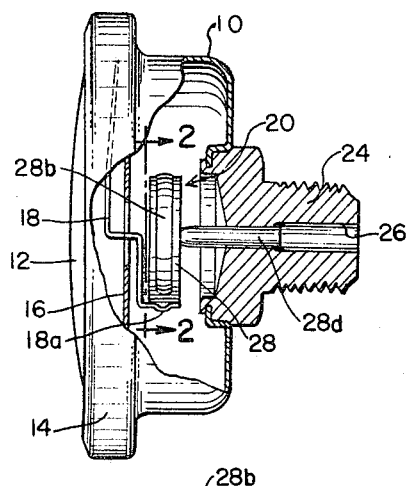
FIGURE 1 is a view partly in elevation and partly in cross section of a pressure gauge employing the Bourdon spring of this invention and wherein the spring is shown about twice normal size for the particular spring herein described.

The Bourdon spring of this invention is used in fluid pressure indicating gauges of which the one shown generally in FIGURE 1 is an example. This gauge includes a suitable casing 19 having a transparent crystal 12 held in the casing by means of a bezel ring 14. Positioned in back of the crystal is the dial 16 over the face of which the needle 18 sweeps in an arc. The movement of this needle is effected by means of the Bourdon spring indicated generally at 20. The needle is secured in any suitable manner to the end of the spring, as indicated at 18a. Mounted on the back wall of the casing 10 is a socket 24 externally threaded for mounting as conditions require. This socket is connected to the gauge casing in any suitable manner and has a central passage 26 extending therethrough. The tubular end 28d of the Bourdon spring is sealed at the inner end of the passage 26 so that the pressure fluid, the pressure of which is to be measured, can be introduced into the spring, which, of course, is hollow.

The structure shown in FIG. 1 is conventional with the exception of the spring construction and the manner in which the needle is connected to the spring and operates through an aperture in the dial and the manner in which the casing is connected to the socket, as shown, see the copending application of Robert J. Ingham and Robert D. Bissell, Ser. No. 465,361, filed June 21, 1965.

Figure 2:
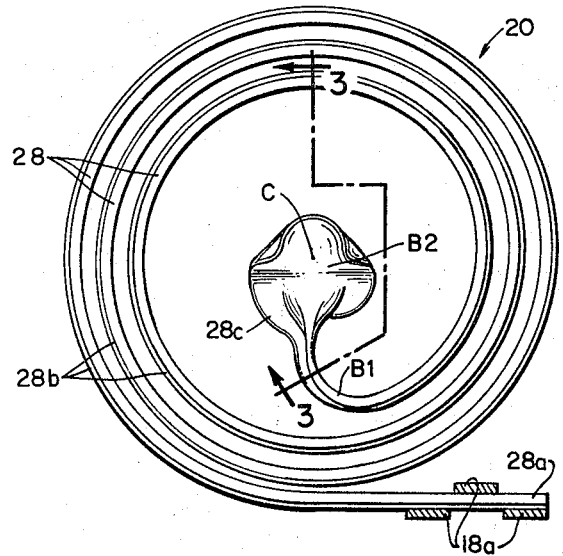
FIGURE 2 is a plan view of the Bourdon spring enlarged about 8 times.
Figure 3:
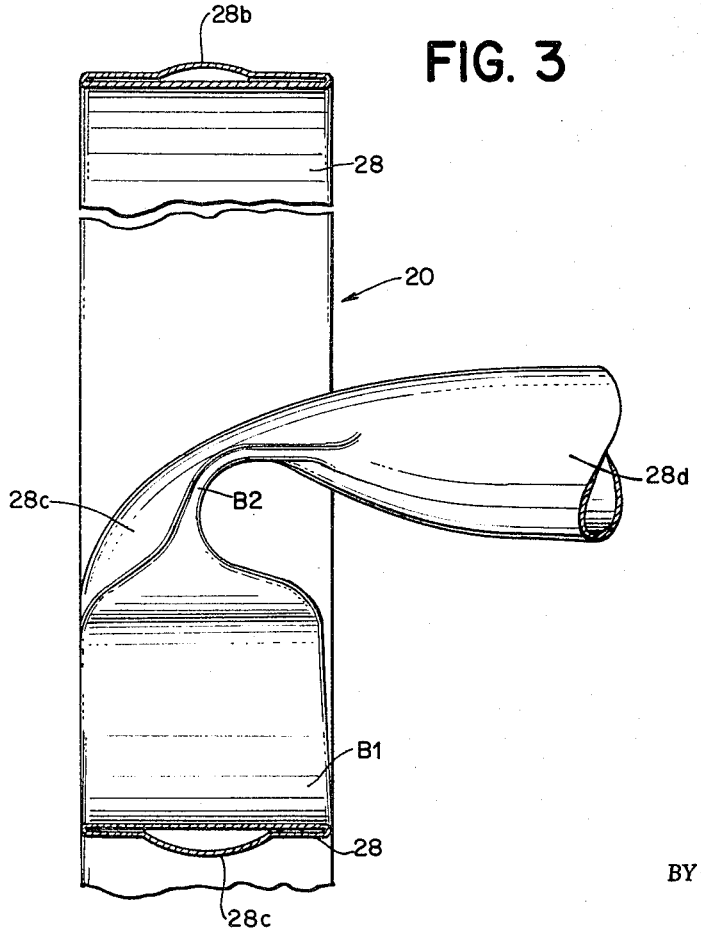
FIGURE 3 is a view, partly in cross section and partly in elevation on the line 3—3 of FIG. 2, of the spring, which in this case has been enlarged 16 times.

The novel subject matter of this application is illustrated by the construction of the tube and Bourdon spring 20 made from it. As shown in FIGS. 2 and 3 this spring is made up of a tube which is sealed off at the end 28a. This spring is made from a single piece of tubing having a relatively long section 28 which is flat and an input terminal end 28d which is circular. The flat portion is provided with a lateral deformation 28b in one of its flat, parallel walls forming an internal groove which increases the internal spacing between said parallel walls, see the upper part of FIG. 3. As shown, this groove extends from the sealed end 28a to the point B1. However, the lateral offsetting of the flat wall at the juncture between the flat section and the tubular section starting at B1 is increased gradually, as indicated at 28c, see the bottom part of FIG. 3. Thus the radius of the groove and the internal spacing between the tube's parallel walls are greater at 28c than at 28b.

As is clear from FIG. 2, the flat section of the spring is coiled into a planar multi-turn spiral, the end 28a extending off generally in a tangential direction. The input cylindrical terminal at 28d of this spring extends at right angles to the plane of the spiral and the axis of this extension includes the center of the spiral. This construction is accomplished by a pair of bends. Looking at FIG. 2 it will be seen that in the region of cross section change the tube is provided with the bend B1 which is in the plane of the spiral and extends toward the center thereof. The tube then goes into a second bend B2, see FIG. 3. It lies in a plane at right angles to the plane of the spiral.

Having in mind that this Bourdon spring is of very small dimension and remembering that a tube should not be bent on a radius less than the diameter of the tube in order to prevent it from collapsing, the reason for the enlargement of the groove will be apparent. The enlargement of this groove in the region of cross section changeover prevents the tubing from collapsing and sealing off or becoming unduly restricted when bent sharply. While it is difficult to sense from the drawings, the spring illustrated is made from a beryllium copper tube which has an outside diameter of 0.0775″. The wall thickness of the tubing is 0.00255″. The radius of the two bends B1 and B2 is 1/16″, that is 0.0625″. Experience establishes that without the provision of the groove, as described, it would not be possible to bend this tube on such small radii without either completely collapsing it or seriously restricting its internal passage.

In the actual spring illustrated even the radius of the multi-turns is small enough so as to make it desirable to continue the groove 28b throughout the length of the flat section. In larger Bourdon springs it may be sufficient to provide the groove only on the region of cross section changeover to permit, where required, sharp bends without collapse or restriction.

From the above description it will be apparent to those skilled in this art that the subject matter of this application is capable of some variation without departure from its central novelty. It is preferred, therefore, that the disclosure herein be taken in an illustrative sense and that the scope of protection afforded hereby be determined by the claims.

What is claimed is:

1. A fluid pressure element of the type described comprising a tubing sealed at one end and having a relatively flat section extending from its sealed end and coiled into a planar multi-turn spiral and terminating in a cylindrical section at its other end, said cylindrical section extending at right angles to the plane of said spiral from a region on the flat section of said tubing at which said tubing includes a longitudinally extending lateral enlargement increasing the internal tube spacing thereat.

2. In the combination of claim 1 the axis of said cylindrical section passing through the center of said spiral.

3. In the combination of claim 1 said tubing being curved in the plane of said spiral and in a plane at right angles to the plane of said spiral.

4. A small-diameter metal tube having a flattened oval cross section with spaced substantially parallel wall portions joined by curved end wall portions, the inner surface of one of said parallel wall portions having a groove extending longitudinally of said tube so as to form a longitudinally extending region of increased internal spacing between said parallel wall portions, said tube including a sharply bent portion which provides an abrupt change in the course of said tube, and wherein the increased spacing between said parallel wall portions in said longitudinally extending region is further increased adjacent the point at which said tube is sharply bent.

5. A small-diameter metal tube according to claim 4 wherein said tube is a fluid pressure element sealed at one end and wherein on one side of said sharp bend said tube is coiled into a planar multi-turn spiral.

6. A small-diameter metal tube acording to claim 5 wherein said tube includes a cylindrical portion opposite said sealed end and projecting at substantially a right angle to the plane of said planar multi-turn spiral.

7. A small-diameter metal tube according to claim 6 wherein said sharply bent tube portion also includes a point at which the inner coil of said spiral is sharply bent toward the center of the planar multi-turn spiral.

8. A small-diameter metal tube according to claim 7 wherein said cylindrical tube projection is substantially aligned with the center of the planar multi-turn spiral.

References Cited
UNITED STATES PATENTS

| | | | |
|---|---|---|---|
| 537,588 | 4/1895 | Steinle | 73—394 |
| 1,714,988 | 7/1924 | Schlaich | 73—418 |
| 1,798,645 | 3/1926 | Withers | 73—393.2 |

LOUIS R. PRINCE, *Primary Examiner.*

D. E. CORR, *Assistant Examiner.*